Figure 1:
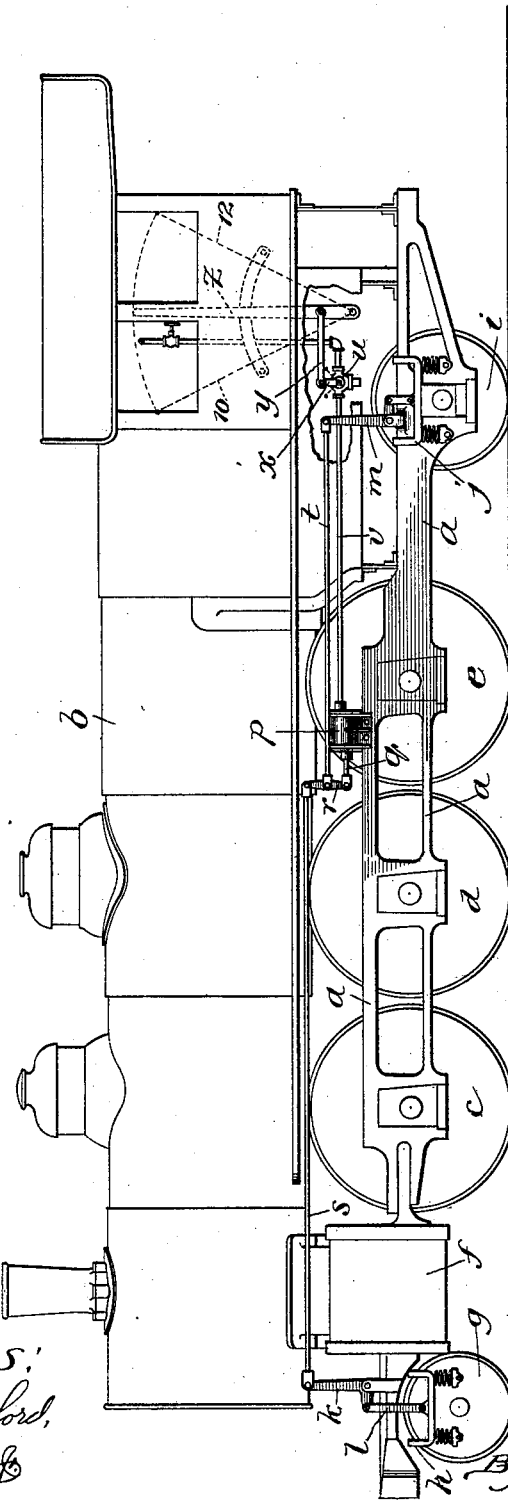

No. 697,535. Patented Apr. 15, 1902.
J. PLAYER.
LOCOMOTIVE.
(Application filed Aug. 10, 1901.)
(No Model.) 3 Sheets—Sheet 1.

Witnesses:
Chas. E. Gaylord,
John Enders Jr.

Inventor:
John Player,
By Thomas F. Sheridan,
Atty.

THE NORRIS PETERS CO., PHOTO-LITHO., WASHINGTON, D. C.

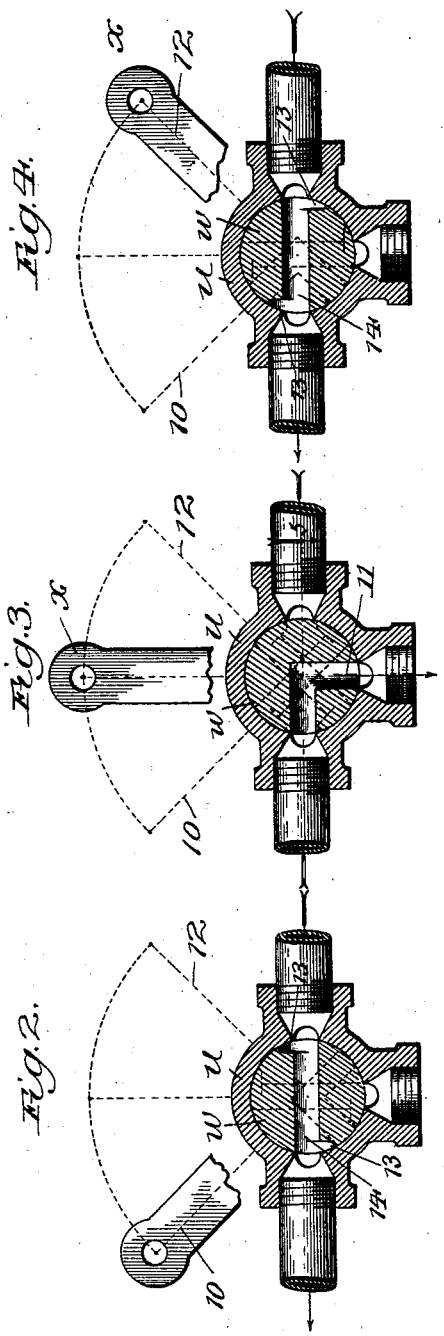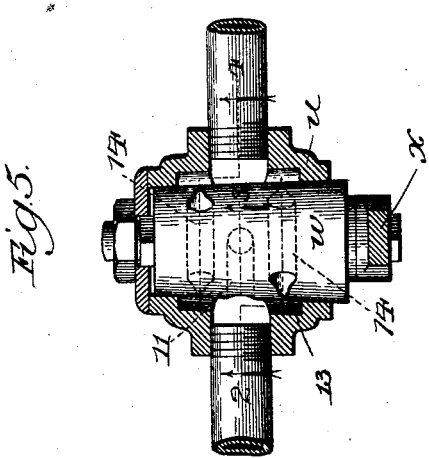

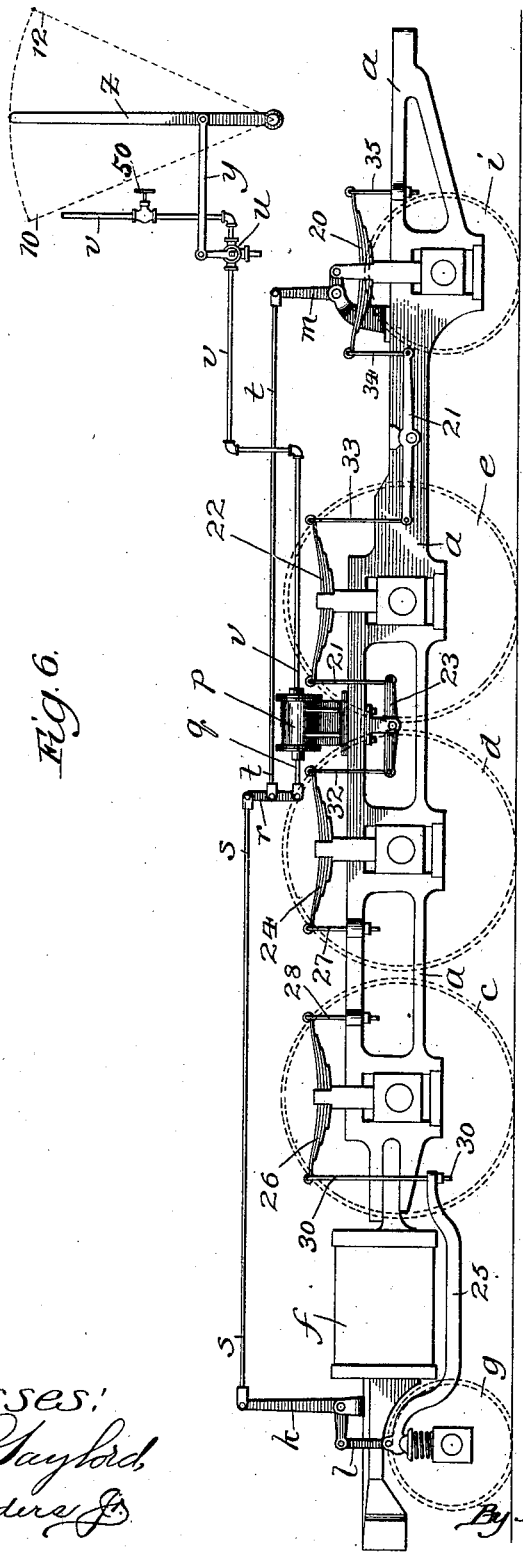

UNITED STATES PATENT OFFICE.

JOHN PLAYER, OF TOPEKA, KANSAS.

LOCOMOTIVE.

SPECIFICATION forming part of Letters Patent No. 697,535, dated April 15, 1902.

Application filed August 10, 1901. Serial No. 71,545. (No model.)

*To all whom it may concern:*

Be it known that I, JOHN PLAYER, a citizen of the United States, residing at Topeka, in the county of Shawnee and State of Kansas, have invented certain new and useful Improvements in Locomotives, of which the following is a specification.

This invention relates to that type of locomotives which are fitted with what are known as "equalizers"—mechanisms arranged to distribute the weight of the locomotive in the desired manner—that is, to provide for the carrying of the desired weight by each and every wheel of the locomotive.

The invention relates particularly to mechanisms for moving these equalizers so as to change or redistribute the weight to meet special conditions and requirements, all of which will more fully hereinafter appear.

The principal object of the invention is to provide a locomotive of the class described having equalizers with means for operating such equalizers and changing or redistributing the weight to meet special conditions and requirements.

Further objects of the invention will be apparent from an examination of the drawings and the following description and claims.

The invention consists principally in a locomotive provided with a set of driving, front guiding, and rear trailing wheels, equalizers for distributing the weight of the locomotive to these wheels, and means for operating the equalizers and redistributing the weight on the wheels.

The invention consists, further, in a locomotive of the class described in which there is combined a set of main driving, front guiding, and rear trailing wheels, equalizing mechanism for normally distributing the weight on such wheels, and means for operating the equalizing mechanism to redistribute the weight supported by the front guiding and rear trailing wheels upon the set of main driving-wheels.

The invention consists, further, in a locomotive of the class described in which there is combined a main driving-wheel arranged at each side of the locomotive, front guiding-wheels, rear trailing wheels, equalizing mechanism for distributing the weight in the desired manner upon the front guiding and rear trailing wheels, and means for operating the equalizing mechanism to change or redistribute the weight from the front guiding and rear trailing wheels to the main driving-wheels, and vice versa.

The invention consists, further, in a locomotive of the class described in which there is combined a supporting frame portion, main driving-wheels, front guiding and rear trailing wheels, equalizing mechanism pivotally supported by the frame and connected with the front guiding and rear driving wheels, lever mechanism pivotally secured to the frame and connected with the front guiding-wheel and rear trailing-wheel equalizing mechanism, and means for operating the equalizing mechanism to rearrange or redistribute the weight supported on the front driving and rear trailing wheel trucks to the main driving-wheels, and vice versa.

The invention consists, further and finally, in the features, combinations, and details of construction hereinafter described and claimed.

In the accompanying drawings, Figure 1 is a side elevation of a locomotive constructed in accordance with these improvements; Fig. 2, an enlarged sectional view of the controlling-valve, taken on line 2 of Fig. 5, showing the plug-valve in one position; Fig. 3, a similar view taken on line 3 of Fig. 5, showing the plug thereof in an exhaust position; Fig. 4, a similar view taken on line 4 of Fig. 5, showing such valve in the other limit of motion from that shown in Fig. 2; Fig. 5, a longitudinal sectional view taken on line 5 of Fig. 3, looking in the direction of the arrow; and Fig. 6 a diagrammatic view of a portion of the locomotive frame and equalizer mechanisms.

In the art to which this invention relates it is well known that equalizing mechanisms have added considerably to the efficiency of the locomotive, in that they have enabled the designer and constructor to distribute the weight of the locomotive in a proportionate manner to each and every wheel thereof, thereby providing for the desired rail adhesion. In certain classes of locomotive, however, the weight which is distributed for running purposes is not distributed altogether in the proper manner to obtain the desired rail adhesion for starting of the train. Again, where the weight is placed to a considerable extent on the driving-wheels in order to obtain the desired traction it becomes desirable, and in fact necessary, when the locomotive is crossing bridges to distribute the weight throughout the locomotive as much as possible to minimize the destructive action. This invention, therefore, is intended primarily to provide a locomotive with suitable equalizing mechanism and means for operating these equalizing mechanisms so as to redistribute or change the weight from the guiding and controlling and also trailing wheels to the main driving-wheels, and vice versa, whenever desirable or necessary.

In illustrating and describing my improvements I have only illustrated and described that which I consider to be new, taken in connection with so much that is old as will properly disclose the invention and enable those skilled in the art to practice the same, leaving out of consideration other and well-known mechanisms, which if shown and described herein would only tend to confusion, prolixity, and ambiguity.

In constructing a locomotive in accordance with these improvements I make a frame $a$ of the desired size, shape, and strength to support the operative and other parts in position for use. The usual locomotive-boiler $b$ is secured to and supported upon this frame portion in any desired or usual manner. To movably support the parts in position for use, the frame is provided in this instance with three pairs of main drivers, $c$, $d$, and $e$, rotatably mounted in the usual journal-boxes and provided with the usual axles, and are connected with the piston in the cylinder $f$ in the usual manner, all of which will be understood by those skilled in the art.

The forward end of the frame portion is provided with a pair of guiding-wheels $g$, rotatably mounted in suitable journal-boxes, upon which, by means of a saddle $h$, a portion of the weight of the locomotive is distributed, the saddle being connected to the rest of the machine in order to maintain its distribution by the usual equalizer, which is referred to and shown in the diagram view hereinafter described. The rear portion of the frame is provided with a pair of trailing wheels $i$, rotatably mounted in the usual manner in the proper journal-boxes. A portion of the weight of the rear of the locomotive and its frame rests upon a second saddle $j$ and through it upon the rear trailing wheels. This weight is equalized and distributed to the rear guiding-wheel by means of the equalizing-bar, hereinafter referred to and shown in the diagrammatic view. It is sufficient to say at this point that these mechanisms are well known and thoroughly understood by those skilled in the art.

From the foregoing description and an examination of the drawings it will be seen that the major portion of the weight rests upon the main driving-wheels, that a portion is carried by the front pilot or guiding wheels and the remainder by the rear trailing wheels. Oftentimes in the starting and stopping of the locomotive there is not sufficient weight upon the main driving-wheels to develop the desired amount of rail adhesion for the starting. It becomes desirable, therefore, at such times to throw as much of the weight as may be deemed safe upon these main driving-wheels. To accomplish this result, I provide an operating-lever $k$ and pivotally secure it to the frame, and by means of a link $l$ pivotally connect it with the saddle $h$, which, it will be understood, is provided with an equalizer that is connected to the frame adjacent to the front driving-wheel. By moving this operating-lever at its upper end to the right it will be seen that it raises, through its connecting-link, the saddle $h$, and thereby its equalizer, taking off a portion of the weight when moved the desired distance and placing most of it upon the front driving-wheel and a portion of it upon the central driving-wheel. The rear portion of the frame is also provided with a second operating-lever $m$, which is pivoted thereto, and by means of the link $n$ is pivotally connected with the saddle $j$ of the rear trailing wheel. By moving this second operating-lever $m$ to the left, as shown in Fig. 1, it will be seen that the saddle and its equalizer are also raised, so that a portion of the weight is taken from the rear trailing wheel and distributed upon the rear and central main driving-wheels, as hereinafter referred to and shown in the diagrammatic view. It will thus be seen that considerable weight has been added to the main driving-wheel by operating the equalizers, so that a larger amount of rail adhesion can be developed and used for the purpose of starting the locomotive and train.

When the locomotive is crossing a bridge, it is desirable if a larger portion of the weight than is necessary should happen to be upon the main driving-wheels that it should be again redistributed upon all of the wheels in the desired manner, so as to minimize the destructive impact upon the bridge structure. It is also well known that in crossing a bridge the engineer generally permits the locomotive to "run" over without pressure—that is, permits the weight of the train to drive itself over. It becomes desirable therefore that the redistribution of the weight upon the proper wheels should be automatic. To accomplish this result, it is best to have means for moving the "operating-levers," as I prefer to term them, automatically with the shifting of the link mechanism. In order to accomplish this result, I provide what I term an "operating-cylinder" $p$, which is provided with a piston, the piston-rod $q$ of which extends out of one end thereof, all of which is arranged and operated by fluid-pressure, preferably compressed air. This piston-rod is connected to one end of an intermediate lever $r$, the other end of such lever being connected by means of a connecting-rod $s$ with the operating-lever $k$, while what might be termed the "fulcrum-point" of this intermediate lever is pivotally secured to and connected with the other operating-lever $m$ by means of a connecting-rod $t$, as shown particularly in Fig. 1. The movement of this piston $q$ therefore in one direction—outwardly—moves one operating-lever to the right and the other to the left—that is, when the operating-cylinder is supplied with the desired fluid-pressure these operating-levers are moved to raise the respective equalizers, and thereby place the maximum weight upon the main drivers to obtain the desired rail adhesion, while when the fluid-pressure is exhausted from such operative cylinder the weight automatically tends to distribute itself and be rearranged upon the proper and desired wheels and in the normal manner. As above suggested, it is desirable that this operating-cylinder should be supplied with its amount of motive fluid simultaneously or coincident with the shifting of the link mechanism and that such fluid should be exhausted when the reversing-lever reaches the "dead-point." To accomplish this result, a controlling-valve is provided, formed of a casing $u$ and arranged in the supply-pipe $v$ and between the operating-cylinder and the source of motive fluid, which in this instance is compressed air. This controlling-valve is provided with a plug $w$, the end of which has a valve-lever $x$ secured thereto, which valve-lever is connected by means of a connecting rod or link $y$ to the reversing-lever $z$ of the locomotive. When the reversing-lever is moved—say to the position shown in dotted line 10 of Figs. 1 and 2—the link mechanism (not shown but well known) is moved to position to drive the locomotive forward. This same movement of the reversing-lever throws the valve-lever and plug-valve into the position shown in Fig. 2, which permits the air or other motive fluid under pressure to pass through the supply-pipe to the operating-cylinder, forces the piston-rod $q$ outwardly, and tends to operate the intermediate lever $r$ in such manner that the operating-levers $k$ and $m$ are moved to the right and left respectively, all of which transfers a portion of the weight on the front pilot or guiding wheels and rear trailing wheels upon the main driving-wheels, thus tending to develop the maximum amount of rail adhesion to more efficiently start the locomotive.

It will thus be seen from an examination of Figs. 1 and 3 that when the reversing-lever and operating-valve are brought to the position shown in such figures the link mechanism is in position to stop the locomotive and the controlling-valve is in position to permit the motive fluid in the operative cylinder to exhaust out through the passage 11 to permit the weight of the locomotive to distribute itself—that is, to move the operating-levers $k$ and $m$ to the left and right, respectively, and rearrange the driving-weight upon the pilot and trailing wheels. When the reversing-lever is moved to the position shown by dotted line 12 in Fig. 1, the link mechanism is in position to reverse the running direction of the locomotive, and the operating-valve lever is moved to the same position, as shown in Fig. 4, so that the motive fluid passes through such valve from the supply-pipe, again enters the operating-cylinder to force the piston-rod outwardly and move the operating-levers $k$ and $m$ to the right and left again, respectively, and throw the maximum load upon the driving-wheels. From this description of construction and operation it will be seen that the furnishing of the supply of motive fluid and exhausting of the same from the operating-cylinder is coincident with and simultaneous with the movements of the reversing-lever, all of which acts to prevent the danger of the engineer forgetting to redistribute the weight of the locomotive when entering upon a weak road-bed, bridge, or other structure. When additional weight on drivers is not desired, valve 50 can be closed, and weight will resume normal position on all wheels. The weight-distributing mechanism thus becomes inoperative.

The opening in the controlling-valve plug is constructed and arranged so that the supply of motive fluid that passes therethrough is at first small, gradually increasing until the minimum is reached and the maximum amount supplied. Figs. 2, 3, and 4, respectively, show the passages through the plug of the valve, and, as shown particularly in Fig. 5, the passages 13 and 14 at the ends thereof are somewhat kite-shaped in contour, so that as the alinement of the supply-passages with the supply-pipe first takes place the minimum amount of fluid under pressure is permitted to pass through and into the operating-cylinder, thus tending to raise the equalizers a small amount and shift a small amount of additional weight upon the driving-wheels, while when the parts are in the position shown in Figs. 2 and 4 the maximum amount of motive fluid is supplied and the equalizing mechanism is moved the maximum amount, thus throwing the maximum weight upon the main drivers.

In Fig. 6 I have shown the mechanisms arranged in diagrammatic view, in which the frame $a$ is provided with the same number of driving-wheels as in Fig. 1, the same pilot-wheel, and the same trailing wheel. Instead, however, of using the saddle on the trailing wheel in the diagram I have shown for clearness the usual semi-elliptic spring 20, through which the weight is equalized and distributed upon the trailing wheel. In this figure it will be seen that the trailing wheel is coupled with the rear driving-wheel by means of the equalizer 21, which is connected thereto through the intermediary of the semi-elliptic spring 22, and which rear driving-wheel is coupled with the central driving-wheel by means of the equalizer 23 through the intermediary of the semi-elliptic spring 24, while the saddle of the front pilot-wheel is coupled with the front driving-wheel by means of the equalizer 25 through the intermediary of the semi-elliptic spring 26. The different connections are made by means of the hangers 30, 31, 32, 33, 34, and 35, respectively. It will also be seen that the elliptic springs are connected with the frame of the locomotive by means of the hangers 27 and 28.

From the foregoing and an examination of the diagram it will be seen that when the motive fluid enters the operating-cylinder $p$ the piston-rod $q$ is moved outwardly and the intermediate lever $r$ pushed outwardly to move the operating-levers $k$ and $m$, and thereby throw the maximum load upon the driving-wheels. When the motive fluid is exhausted from the operating-cylinder, a reversal of the parts takes place and a redistribution of the weight is had upon the proper wheels and in the normal manner.

Supposing the weight of the locomotive to be one hundred and ninety-five thousand pounds and properly distributed, the driver $c$ would normally carry forty-one thousand, the driver $d$ forty-three thousand, and the driver $e$ forty-one thousand, the pilot-wheel thirty thousand, and the trailing wheel forty thousand, placing thereby one hundred and twenty-five thousand pounds upon all of the drivers. By furnishing a supply of motive fluid to the operating-cylinder the operating-levers are moved so as to operate the equalizers and take approximately ten thousand pounds off the pilot-wheel and ten thousand additional off of the trailing wheel, distributing it about as follows: six thousand five hundred pounds upon the front driver, six thousand five hundred upon the rear driver, and about seven thousand upon the central driver—in all placing twenty thousand additional pounds upon the main driving-wheels and increasing the rail adhesion that amount, and thereby the efficiency in starting the locomotive and train, all of which will be understood and appreciated by those skilled in the art.

While I have described my invention with more or less minuteness as regards details and as being embodied in certain precise forms, I do not desire to be limited thereto unduly or any more than is pointed out in the claims. On the contrary, I contemplate all proper changes in form, construction, the omission of immaterial elements, and the substitution of equivalents as circumstances may suggest or necessity render expedient.

I claim—

1. In a locomotive of the class described, the combination of a frame portion provided with a set of driving, front guiding and rear trailing wheels, equalizing mechanism for distributing the weight of the locomotive upon all of these wheels, and means for operating the equalizing mechanism to redistribute and rearrange the weight upon these wheels, substantially as described.

2. In a locomotive of the class described, the combination of a frame portion provided with a set of main driving, front guiding and rear trailing wheels, equalizing mechanism connecting such wheels together and normally distributing the weight on all of such wheels, and means for operating the equalizing mechanism to redistribute the weight supported by the front guiding and rear trailing wheels upon said main driving-wheels, substantially as described.

3. In a locomotive of the class described, the combination of a frame portion provided with a set of main driving-wheels, rear trailing wheels and front guiding-wheels, equalizing mechanism for distributing the weight between the front guiding and the main drivers and the rear trailing and main drivers, an operating-lever connected with the front part of the equalizers, a second operating-lever connected with the rear part of the equalizers, and means for operating both of these operating-levers to move the equalizers and rearrange and redistribute the weight from the front guiding and rear trailing wheels upon the main set of drivers, and vice versa, substantially as described.

4. In a locomotive of the class described, the combination of a frame portion provided with a set of main driving-wheels, front guiding and rear trailing wheels, equalizing mechanism pivotally secured upon the frame of the machine and connecting the different sets of wheels together to normally distribute the weight in proper proportions upon such wheels, an operating-lever pivotally secured to the frame of the machine and to the equalizers in the front of the locomotive, a second operating-lever pivotally secured to the frame of the locomotive and to the equalizers in the rear of the locomotive, an intermediate lever connected with both of such operating-levers, and an operating-cylinder provided with a movable piston connected with such intermediate lever to simultaneously move both of such operating-levers and redistribute the weight upon the wheels, substantially as described.

5. In a locomotive of the class described, the combination of a frame portion provided with a set of main driving-wheels, front guiding and rear trailing wheels, equalizing mechanism pivotally secured upon the frame of the machine and connecting the different sets of wheels together to normally distribute the weight in proper proportions upon such wheels, an operating-lever pivotally secured to the frame of the machine and to the equalizers in the front of the locomotive, a second operating-lever pivotally secured to the frame of the locomotive and the equalizers at the rear of the locomotive, an intermediate lever pivotally connected with both of such operating-levers, an operating-cylinder provided with a movable piston connected with such intermediate lever to simultaneously move both of such operating-levers and redistribute the weight upon the wheels, a supply-pipe connecting the operating-cylinder with a source of motive fluid, and a controlling-valve in such pipe connected with the reversing-lever of the locomotive to be operated simultaneously therewith and admit motive fluid to and shut it off from the operating-cylinder coincident with the throwing of the link mechanism into its different position, substantially as described.

6. In a locomotive of the class described, the combination of a frame portion provided with a set of main driving-wheels, front guiding and rear trailing wheels, equalizing mechanism pivotally secured upon the frame of the machine and connecting the different sets of wheels together to normally distribute the weight in proper proportions upon such wheels, an operating-lever pivotally secured to the frame of the machine and to the equalizers in the front of the locomotive, a second operating-lever pivotally secured to the frame of the locomotive and the equalizer at the rear of the locomotive, an intermediate lever pivotally secured to both such operating-levers, an operating-cylinder provided with a movable piston connected with such intermediate lever to simultaneously move both of such operating-levers and redistribute the weight upon the wheels, a supply-pipe connecting the operating-cylinder with a source of motive fluid, and a controlling-valve in such supply-pipe connected with the reversing-lever of the locomotive and provided with a passage to admit motive fluid gradually to the operating-cylinder, substantially as described.

7. In a locomotive of the class described, the combination of a frame portion provided with a set of driving-wheels, front guiding and rear trailing wheels, equalizing mechanism for distributing the weight of the locomotive upon these wheels, and means for gradually operating the equalizing mechanism to redistribute and rearrange the weight upon these wheels, substantially as described.

8. In a locomotive of the class described, the combination of a frame portion provided with a set of main driving-wheels, front guiding and rear trailing wheels, equalizing mechanism pivotally secured upon the frame of the machine and connecting the different sets of wheels together to normally distribute the weight in proper proportions upon such wheels, operating-levers pivotally secured to the frame of the machine and to the equalizers, and means for actuating these operating-levers in a gradual manner, substantially as described.

JOHN PLAYER.

Witnesses:
HARRY IRWIN CROMER,
ANNIE C. COURTENAY.